United States Patent
Narasimhan

(10) Patent No.: US 12,499,094 B2
(45) Date of Patent: Dec. 16, 2025

(54) AUTOMATIC FAILOVER SYSTEM FOR CRON JOBS

(71) Applicant: ARRIS Enterprises LLC, Suwanee, GA (US)

(72) Inventor: Mayank Narasimhan, San Diego, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 28 days.

(21) Appl. No.: 18/081,224

(22) Filed: Dec. 14, 2022

(65) Prior Publication Data
US 2024/0134827 A1    Apr. 25, 2024

Related U.S. Application Data

(60) Provisional application No. 63/419,289, filed on Oct. 25, 2022.

(51) Int. Cl.
*G06F 16/176*    (2019.01)

(52) U.S. Cl.
CPC .............. *G06F 16/1774* (2019.01)

(58) Field of Classification Search
CPC .................................. G06F 16/1774
USPC ..................................... 707/704
See application file for complete search history.

(56) References Cited

U.S. PATENT DOCUMENTS

2020/0104107 A1*  4/2020  Hodder ............ G06F 8/71
2021/0073184 A1*  3/2021  Almaraz .......... G06F 16/113

FOREIGN PATENT DOCUMENTS

| CN | 107479859 A | * | 12/2017 | |
| CN | 113342507 A | * | 9/2021 | |
| CN | 114064241 A | * | 2/2022 | ...... G06F 9/4887 |

* cited by examiner

*Primary Examiner* — Amy Ng
*Assistant Examiner* — Anthony G Gemignani
(74) *Attorney, Agent, or Firm* — Chernoff, Vilhauer, McClung & Stenzel, LLP

(57) ABSTRACT

A system supporting automatic failover system for CRON jobs.

7 Claims, 5 Drawing Sheets

AUTOMATIC FAILOVER SYSTEM FOR CRON JOBS

CROSS REFERENCE TO RELATED APPLICATIONS

The present application claims priority to U.S. Provisional Application No. 63/419,289 filed Oct. 25, 2022, the content of which is incorporated herein by reference in its entirety.

BACKGROUND

The subject matter of this application relates to an automatic failover system for CRON jobs.

When performing computing tasks often a network of interconnected computer servers are used. Each of the servers may run different software applications and in many cases each of the servers runs the same software applications, such as those of a server cluster based environment. Some of the tasks associated with maintaining each of the servers, backups, check for broken links in websites, clear website caches, and gathering data from each of the servers are performed on a routine basis which tends to be burdensome to perform.

A command run on, e.g., "CRON", is a scheduling utility that facilities user's input commands for scheduling tasks (e.g., commands or shell scripts) repeatedly at a specific time, in particular non-interactive tasks. The tasks scheduled in cron may be referred to as cron jobs. The users may determine what type of tasks are automated and then they are executed using the syntax within the cron file. The cron utility includes a minimum of 60 seconds between repeating of a job, the cron jobs are not distributed to multiple computers on a network, and if a cron tasks fails it will not run again util the next scheduled time.

A crontab (cron table) file drives the actions of cron by using a configuration file that specifies commands to run periodically on a given schedule. The crontab files are stored where the lists of jobs and other instructions to the cron daemon are maintained. Each user may have their own individual crontab files and often there is a system-wide crontab file.

A distributed software system consists of multiple software components that run on multiple servers which act as a single system to achieve high availability and reliability. In such distributed software systems, the system administrators often require cron jobs that perform periodic maintenance of the systems. For example, some cron jobs are preferably executed on only one of the machines in the cluster of machines, such as sending out an email with system statistics. To achieve this, administrators often configure this type of cron job to run on only one of the machines in the cluster. Unfortunately, in a distributed software system, this poses the risk of the cron job failing to execute if the machine that is configured to run the cron job suffers an outage. This may be referred to as a single point of failure, which is undesirable in a distributed software system that aims for high availability and high reliability.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
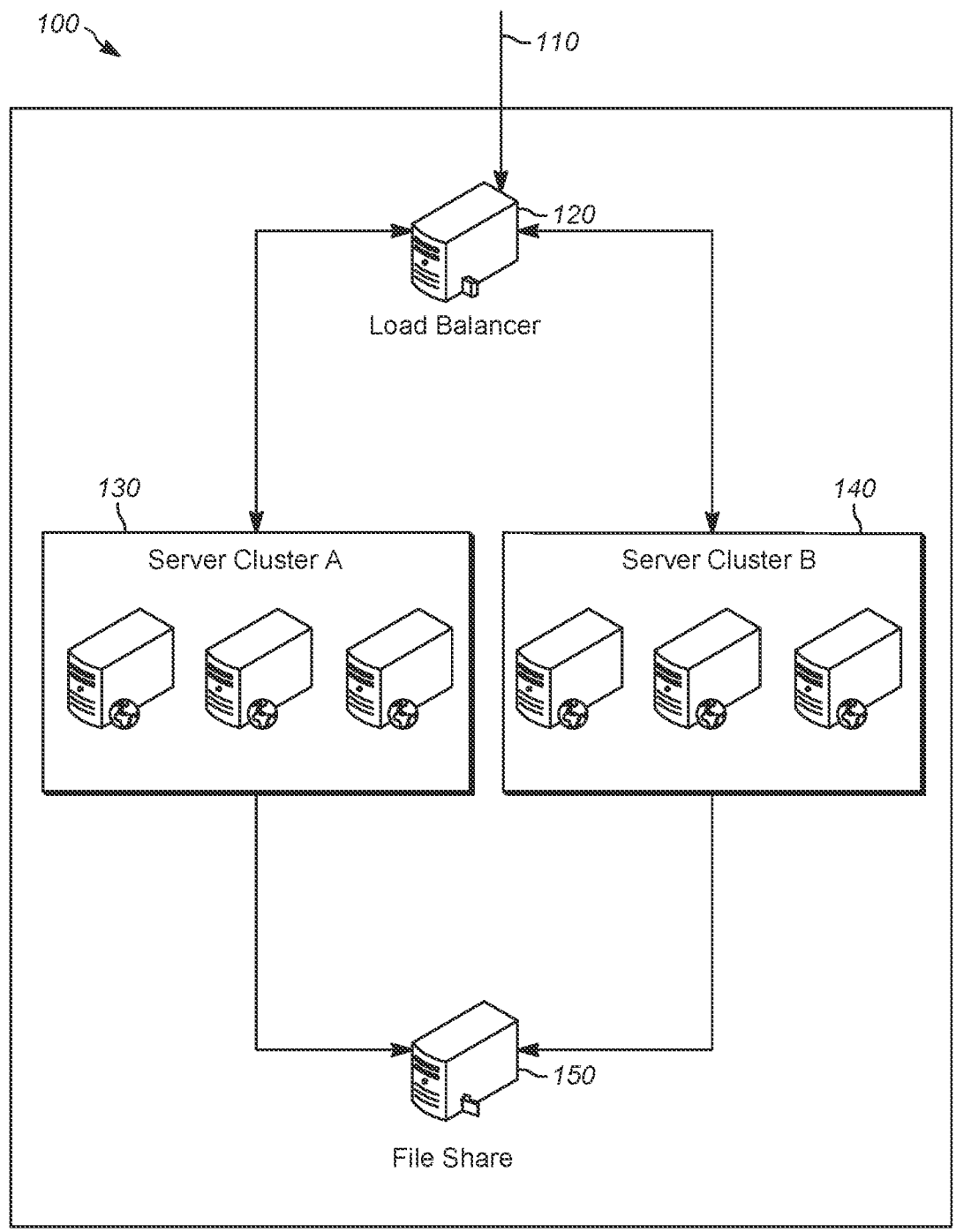
FIG. 1 illustrates a server-based network with clusters.

Referring to FIG. 1, a simplified network 100 that includes server clusters is illustrated. The system may include an interconnection to the network 110, such as the Internet. The system may include a load balancer 120 that balances the processing load among different servers. The servers may be arranged in multiple clusters, such as server cluster A 130 and server cluster B 140. Each of the server clusters 130, 140 may include a plurality of servers, each of which are interconnected to one another. Each of the server clusters 130, 140, inclusive of each of the servers within each of the server clusters 130, 140, may access a file share 150 that maintains files that are accessible by the servers within the network 100. It is noted that the server may be a single physical hardware device operating software thereon, may be a virtual machine on a single physical hardware device or otherwise operating with other virtual machines on the same hardware device, or otherwise any device and/or software providing the functionality of a server. For example, one or more cron files may be maintained on each of the servers where the cron jobs are executed on a periodic basis. For example, one or more cron files 160 may be maintained on the file share that are accessible to a plurality of different servers where the cron jobs are executed on a periodic basis by each of the respective servers.

Figure 2:
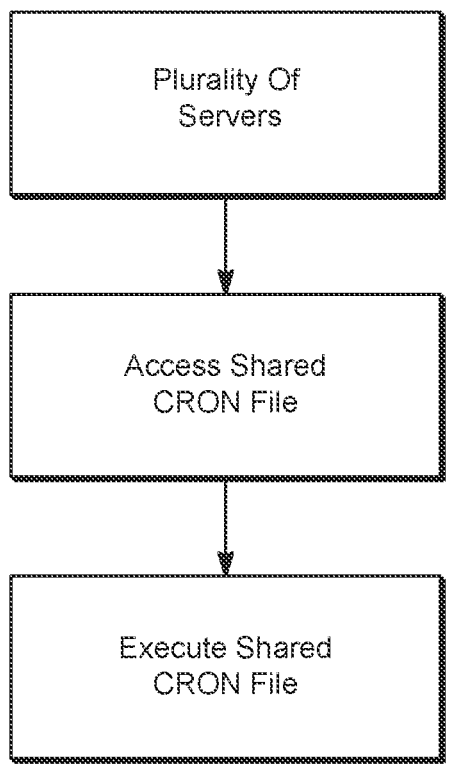
FIG. 2 illustrates servers executing a shared cron file.

Referring also to FIG. 2, for some cron jobs it desirable for each of the servers to access a shared cron file on the file share 150. On a periodic basis, such as hourly, each of the servers executes the tasks in the shared cron file. In this manner, those tasks that are suitable for being executed by each of the servers may be performed and managed by the user in a unified manner. This is especially suitable for server clusters of homogenous servers. Unfortunately, for some tasks such as sending out an e-mail report of the status of the server cluster, this would result in the server sending out redundant corresponding copies of the e-mail report.

Figure 3:
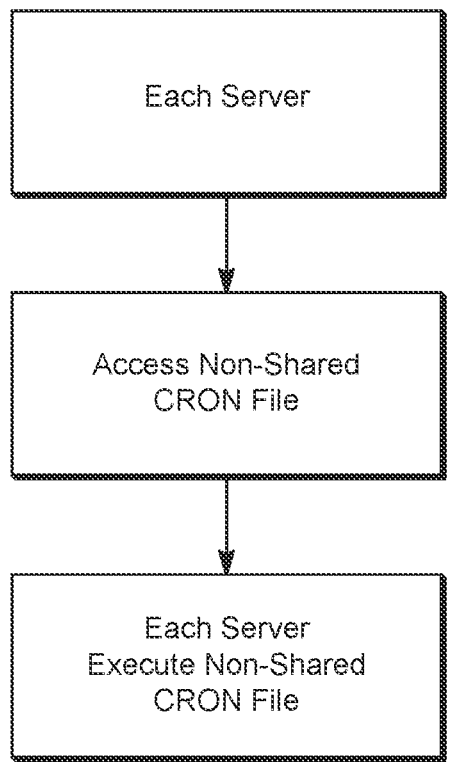
FIG. 3 illustrates respective servers executing respective cron files.

Referring to FIG. 3, for some cron jobs it is desirable for each of the servers to access a non-shared cron file on the respective server itself. On a periodic basis, such as hourly, the respective server executes the tasks in the non-shared cron file. In this manner, those tasks that are suitable for being executed by the respective server may be performed and managed by the user in an individualized manner. For some tasks, such as sending out a single non-redundant e-mail report of the status of the server cluster, this is an appropriate use of a non-shared cron file. However, in the event that the particular server is offline, non-operational, or otherwise impaired in some manner, the single non-redundant e-mail report would not be provided.

Figure 4:
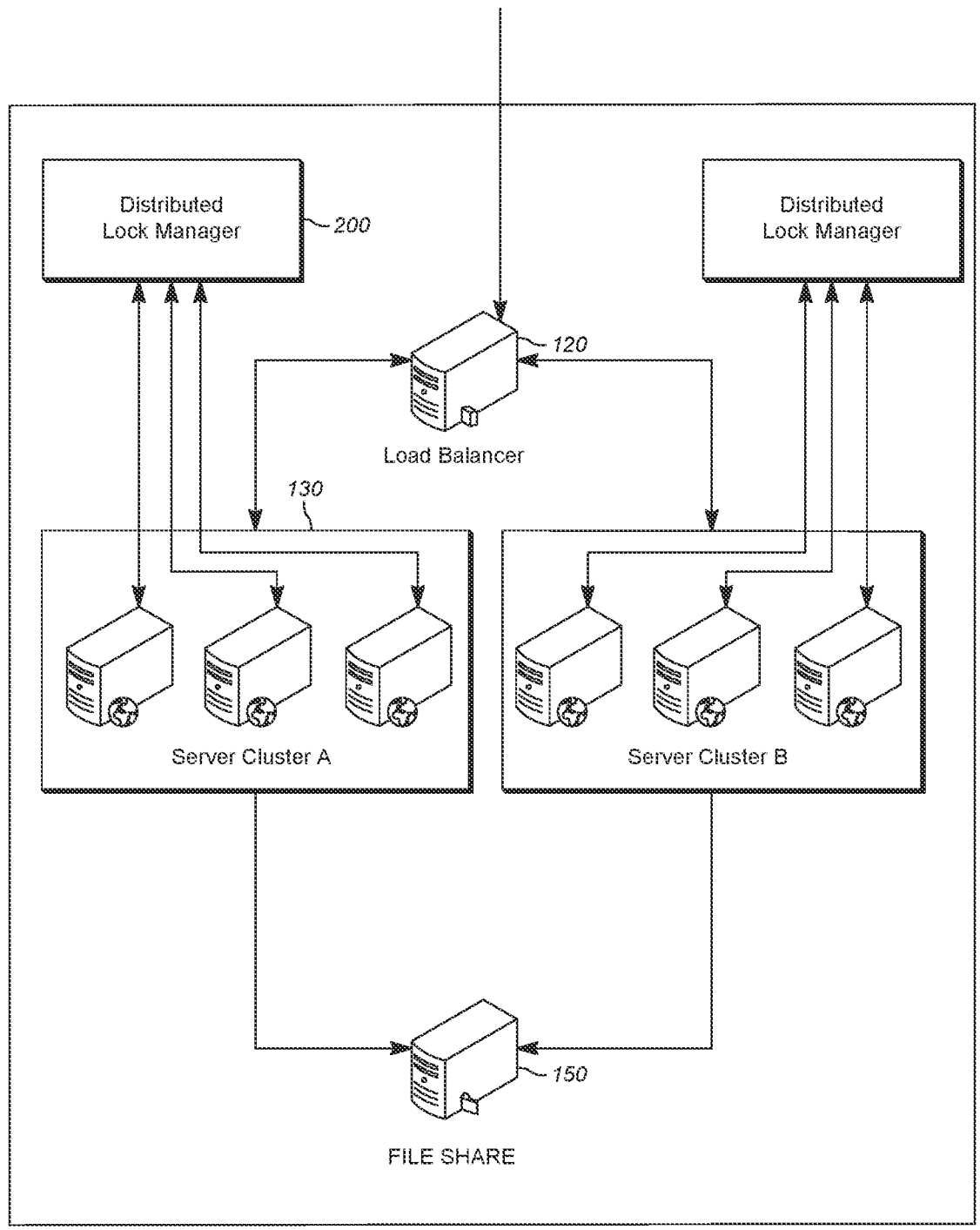
FIG. 4 illustrates a server-based network with clusters and distributed lock manager.

Referring to FIG. 4, to enable the managed sharing of one or more cron files that are accessible on the shared file share 150 among the set of servers 130, in a manner that ensures only one of the servers executes the cron file while being potentially accessible to any of the servers that are currently available, it is desirable to include an automatic failover system. The automatic failover system is configured to ensure that only one of the servers executes the cron file for any particular time period defined by the cron file. The automatic failover system is configured to ensure that in the event that one or more of the servers are not currently available (e.g., failed), then only one of the available servers executes the cron file. In this manner, the managed sharing of one or more cron files ensures that a single (or multiple) point of failure does not result in the failure to execute the cron file while simultaneously ensuring that the one or more cron files are only executed by a single server.

The automatic failover system may be in the form of a distributed lock manager 200. The distributed lock manager 200 and/or each of the servers 130 preferably include clustering support that selectively permits each of the servers 130 to access one or more cron files on the file share 150. Each of the servers 130 preferably include clustering support that selectively permits each of the servers 130 to access one or more cron files on the file share 150. In particular, the distributed lock manager 200 only authorizes one of the servers at any particular time the corresponding authorization to access the cron file on the file share 150.

Figure 5:
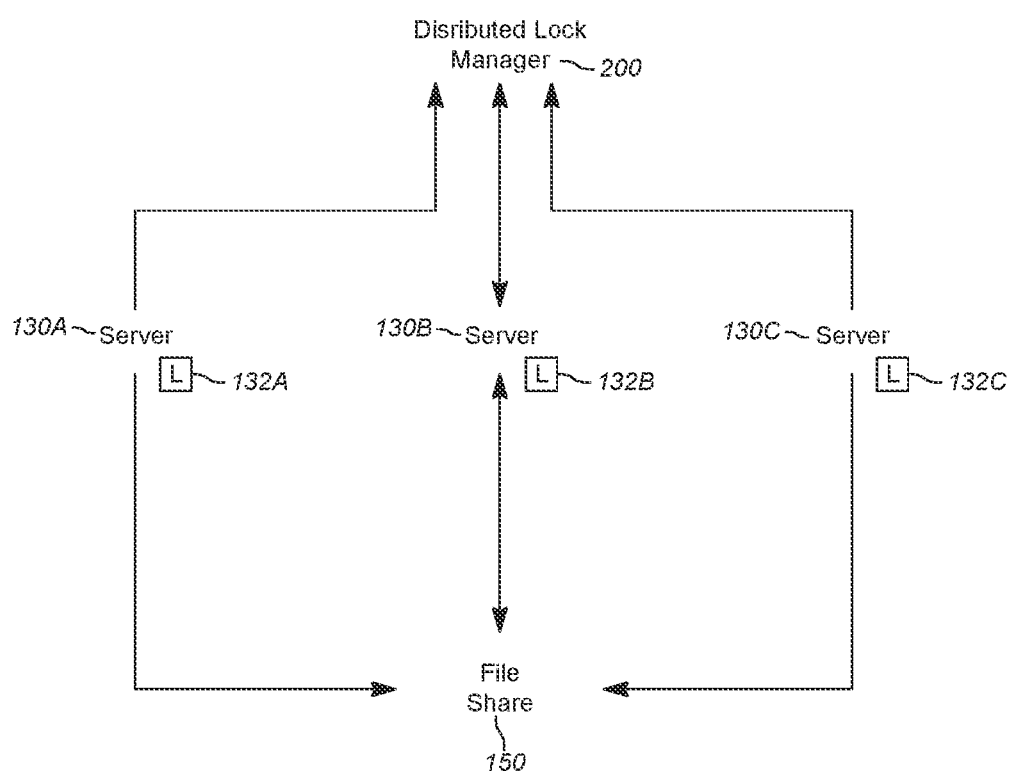
FIG. 5 illustrates a server-based network and the distributed lock manager.

Referring to FIG. 5, each of the servers 130A, 130B, 130C, may include a lease process 132A, 132B 132C, that is configured to periodically request a time-based lease from the distributed lock manager 200. The first server 130A, 130B, 130C that acquires the lease from the distributed lock manager 200 is then provided with a time-based lease to access the one or more cron files, which are then executed on a regular basis. The other servers that were not provided with the time-based lease continue to periodically request the lease from the distributed lock manager 200 in the event that such a lease becomes available. The server 130A, 130B, 130C that acquired the lease from the distributed lock manager periodically renews the lease so that it may continue to execute the cron file from the file share 150. In the event that the server 130A, 130B, 130C that acquired the lease fails, chooses to give up its lease, or otherwise fails to renew its lease in a timely manner, then the lease is available for other servers. The next server 130A, 130B, 130C to request the lease is provided with the lease, while the other servers then not provided with a lease until the next server 130A, 130B, 130C that acquired the lease fails, chooses to give up its lease, or otherwise fails to renew its lease.

Figure 6:
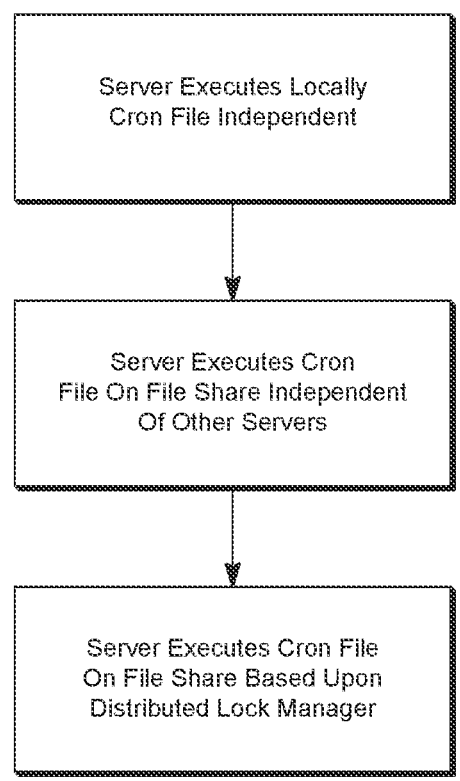
FIG. 6 illustrates a server with different modes of operation for cron files.

Referring to FIG. 6, a server may include the capabilities to execute one or more cron files in a multiple different ways. For example, the server may maintain the one or more cron files locally or on a file share not accessible by other servers, and therefore be the only server configured to execute the cron file, independent of whether the server is operational. For example, the file share may maintain the one or more cron files on a file share that are accessible by the other servers, and therefore each of the servers executes the cron file on a scheduled basis. For example, the file share may maintain the one or more cron files on a file share that are accessible by the other servers based upon permission provided by the distributed lock manager, and therefore only one of the servers executes the cron file on a scheduled basis. The time based lease is preferably between ¼ of a second to 10 seconds in duration.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A system for selectively executing command run on (CRON) files on a computing device that includes a processor comprising,
   (a) a first server in communication with a first file share that stores a first cron file;
   (b) a second server in communication with said first file share that stores said first cron file, where said first server being configured to execute said first cron file independently of said second server being configured to execute said first cron file;
   (c) said first server in communication with a second file share that stores a second cron file that is not accessible by said second server, where said first server being configured to execute said second cron file while said second server simultaneously not being configured to execute said second cron file because such said second cron file is not accessible by said second server;
   (d) said second sever in communication with a third file share that stores a third cron file that is not accessible by said first server, where said second server being configured to execute said third cron file while said first server simultaneously not being configured to execute said third cron file because such said third cron file is not accessible by said first server;
   (e) said first server in communication with a fourth file share that stores a fourth cron file;
   (f) said second server in communication with said fourth file share that stores said fourth cron file, where said first server being configured to execute said fourth cron file independently of said second server being configured to execute said fourth cron file;
   (g) a lock manager operating on a computing device in communication with both said first server and said second server;
   (h) said lock manager provides a time-based lease to only one of said first server and said second server at the same time in response to a request for said time-based lease from a respective only one of said only one of said first server and said second server, where said time-based lease has a duration for a predetermined time period after which the time-based lease automatically expires unless said time-based lease is renewed by said respective only one of said only one of said first server and said second server by said lock manager;

(i) said first server configured to periodically execute said first cron file if it is provided said time-based lease from said lock manager and said first server said renewing said time-based lease to extend said time-based lease for an additional predetermined time period, where during the time that said first server provided said time-based lease said second server is prohibited from executing said first cron file;

(j) said second server configured to periodically execute said first cron file if it is provided said time-based lease from said lock manager and said second server said renewing said time-based lease to extend said time-based lease for an additional predetermined time period, where during the time that said second server provided said time-based lease said first server is prohibited from executing said first cron file;

(k) said first server configured not to periodically execute said first cron file if it is not provided said time-based lease from said lock manager;

(l) said second server configured not to periodically execute said cron file if it is not provided said time-based lease from said lock manager;

(m) wherein said lock manager only provides one of said first server and said second server said time-based lease over the duration of said time-based lease;

(n) wherein said first server configured to periodically execute said second cron file independent of said lock manager;

(o) wherein said second server configured to periodically execute said third cron file independent of said lock manager;

(p) wherein said first server configured to periodically execute said fourth cron file independent of said lock manager;

(q) wherein said second server configured to periodically execute said fourth cron file independent of said lock manager.

2. The system of claim 1 wherein said time-based lease is between ¼ second and 10 seconds in duration.

3. The system of claim 1 wherein said cron file includes shell scripts.

4. The system of claim 1 wherein said cron file includes commands.

5. The system of claim 1 wherein said cron file is not repeatedly executed within 60 seconds.

6. The system of claim 1 wherein said cron file is not executed again if it has a failure until the next scheduled time.

7. The system of claim 1 wherein said second server configured to said periodically execute said cron file if it is provided said time-based lease from said lock manager and renew said time-based lease with said lock manager.

* * * * *